United States Patent [19]

Wolf et al.

[11] Patent Number: 4,527,544
[45] Date of Patent: Jul. 9, 1985

[54] HIGH INSULATING SOLAR BLOCK STRUCTURES

[75] Inventors: Rodney A. Wolf, Amherst Junction; Alan G. Zech, Viroqua, both of Wis.

[73] Assignee: Kimberly Hills, Ltd., Chicago, Ill.

[21] Appl. No.: 521,248

[22] Filed: Aug. 8, 1983

[51] Int. Cl.³ ................................................. F24J 3/02
[52] U.S. Cl. .................................... 126/419; 126/432; 126/450; 47/17; 52/4; 52/503
[58] Field of Search ............... 126/419, 426, 428, 429, 126/431, 438, 444, 445, 450, 432; 47/17; 52/81, 171, 306, 503, 505; 165/485

[56] References Cited

U.S. PATENT DOCUMENTS

| | | | |
|---|---|---|---|
| 2,288,521 | 6/1942 | Gregory | 52/306 X |
| 2,595,905 | 5/1952 | Telkes | 126/419 |
| 2,857,634 | 10/1958 | Garbade et al. | 126/419 X |
| 3,512,745 | 1/1976 | Deminet et al. | 126/445 |
| 3,961,619 | 6/1976 | Estes et al. | 126/444 |
| 4,141,185 | 2/1979 | Keith | 52/171 |
| 4,143,640 | 3/1979 | Pierce | 126/438 |
| 4,219,008 | 8/1980 | Schultz | 126/419 |
| 4,279,240 | 7/1981 | Artusy | 126/419 |
| 4,284,069 | 8/1981 | Hörster et al. | 126/438 |

FOREIGN PATENT DOCUMENTS

2269038 12/1975 France .............................. 126/419

Primary Examiner—Margaret A. Focarino
Attorney, Agent, or Firm—Niblack & Niblack

[57] ABSTRACT

A light-transmissive solar insulating block assembly comprising: light-transmissive insulating block means defining at least one internal cavity for insulating the interior of a structure to be heated; a housing having a light-transmissive cover providing an exterior surface and a plurality of support walls extending between and separating said cover and said block means, said housing cooperating with said block means to define a circulation chamber therebetween, said support walls defining a plurality of passageways for ingress and egress of air into and out of said chamber; and control means operatively pivotally connected to said housing for reflecting radiant heat back into the interior of the structure being heated controlling the amount of light passing through said chamber, and structures constructed from an array of said block assemblies.

16 Claims, 38 Drawing Figures

HIGH INSULATING SOLAR BLOCK STRUCTURES

BACKGROUND OF THE INVENTION

The present invention relates to solar energy modules and more particularly to solar insulating blocks for use in solar greenhouses and other structures.

Many buildings such as greenhouses require roof and/or window coverings that will admit sunlight. It is generally desirable for these transparent or translucent light-admitting sections to have low thermal conductivity in order to provide a savings in heating or cooling costs within the structure. There are a number of low density or cellular materials with high insulative values (commonly measured in terms of "r" value, and defined as the reciprocal of the thermal conductance measured in BTU/hr/ft$^2$/per given thickness of insulating material) but which do not transmit light. On the other hand, a single layer of glass or clear plastic transmits light, but offers little insulation value. Where greater insulation value is required, yet it is necessary to retain the light-transmissive properties of the roof or window, it is common practice to use a double or triple layer of glass or plastic having a small air space between the layers. This technique adds significantly to reducing heat transfer, but numerous applications demand values approaching zero heat transfer.

A further move toward high insulation lead to the development of movable insulation. Movable insulation employs techniques which recognize that the sun only shines during the day, and that additional, non-transparent insulation may be used at night. Such techniques combined maximal nightime insulation with ease of insulation mobility, ranging from simple shutters, shades, drapes or special curtains which may be closed either manually or automatically, to more exotic techniques having double glazing and a relatively deep inner chamber into which can be blown insulation such as polystyrene beads, to more complex and expensive solar panels.

Using added conventional insulation at night has an economical impact on heating costs for the structure's interior, but still suffers from the disadvantage of not providing sufficient daytime insulation. Despite the substantial body of prior art in the field of solar panels, such devices have not gained widespread acceptance because they are expensive, complex and thermally inefficient.

In theory, heat transfer, or its reciprocal, thermal insulation, is simple. Heat energy moves from a region of higher temperature to one of lower temperature by only two means, conduction and radiation. Conduction is the energy transfer that takes place between two masses that are in direct contact with one another, and takes several forms. One form, convection, is so common that it is often definitionally included as a third form of heat transfer. Convection is the more or less circular air flow and consequently hastened heat conduction transfer facilitated by fluid between two regions of dissimilar temperature. The convection phenomenon explains why the air space between double glazing offers diminishing insulative values as the space is widened beyond one or two centimeters. Radiation is the energy given off in electromagnetic form that all bodies above absolute zero emit. Thus, radiation requires no medium of transfer.

While various materials have various heat conductivity and consequently differing insulative values, all materials conduct at least some heat. Heat conduction is zero only in a vacuum. A vacuum, then, represents the theoretical maximum conductive insulation. Radiation, however, flows freely, even across a vacuum. It can, however, be blocked by a shiny, reflective surface. A totally reflective surface therefore represents the theoretical maximum radiation insulation, and a barrier which is both evacuated and reflective represents maximum total insulation. This concept was first put to practical use by Sir James Dewar in 1890 in the vacuum flask or thermos bottle which is still in common usage today both on a small scale for maintaining the temperature of foods and beverages and on a large scale in the cryogenics industry.

There have been several attempts to put this concept to use in the field of solar energy and solar panels. While prior art exists on solar panels which utilize a vacuum, (see for example U.S. Pat. No. 2,918,023) widespread use has not been achieved.

The solution to glazing large, relatively flat areas such as large tracts of farmland, for daytime solar gain and nightime maximum insulation has gone unanswered until the advent of the present invention for two main reasons. First, the tremendous force of full atmospheric pressure against a large, flat surface creates difficult structural problems. For example, two one-meter square plates bounding a $1 \times 100 \times 100$ cm space must withstand roughly ten metric tons of force. Second, any surface which reflects a high percentage of radiant heat will not transmit light.

The art is replete with patents for a wide variety of solar panels and structures such as greenhouses. See for example, U.S. Pat. Nos.: 4,051,832; 4,173,969; 4,178,909; 4,195,441; 4,279,243; 4,267,218; 4,292,955; 4,194,491 4,273,098 and 2,918,023. None, however, have suggested an adequate solution to the above problems.

Structures, such as solar greenhouses are particularly valuable in harsh climates where crops are routinely lost to the vagaries of weather conditions. A particular need for an efficient solar greenhouse which can be economically, simply and efficiently placed over large areas of farmland, is found in harsh climates such as Wisconsin where expensive crops having a long growing season, such as ginseng which has a four year growing cycle from planting to harvest, can be economically disastrous for the farmer. In such harsh winter climates, it is critical to provide for maximum daytime solar gain and maximum nightime insulation to prevent heat loss and temperature drops when sunlight is not available to warm the structure housing the crops. In addition, it is important to protect seedlings from excessive moisture and disease. Is therefore desirable to provide an improved solar energy module which overcomes most if not all of the problems of the prior art.

SUMMARY OF THE INVENTION

The present ninvention provides a light-transmissive solar insulating block assembly and structures constructed therefrom. The block assembly comprises a light-transmissive insulating block means which defines at least one internal cavity for insulating the interior of a structure to be heated; a housing having a light-transmissive cover providing an exterior surface, and a plurality of support walls extending between and separating said cover and said block means, said housing cooperating with the block means to define a circulation chamber therebetween, the support walls defining plurality of passageways for ingress and egress of air into and out of said chamber; and control means operatively pivotally connected to said housing for controlling the amount of light passing through said chamber reflecting radiant heat back into said structure.

The present invention overcomes the problems left unanswered by the prior art and provides a superior light-transmissive, insulating solar block which can be manufactured in any desired size including relatively large modular sections of, for example, up to eight to twelve feet square, and which can be used to construct a solar greenhouse covering up to one-quarter acre or more of farmland. If larger sections of farmland are to be covered, a series of adjoining greenhouse structures may be constructed over the growing crops. As mentioned earlier, such structures are sorely needed for expensive, sensitive crops such as ginseng, and would provide a more certain environment and extend the growing season for a wide variety of crops.

In addition to providing an improved light-transmissive, insulating solar block or panel assembly which can be used either alone or in an array to construct very large structures, the block assembly of the present invention has a number of advantages over the prior art. First, the R value during the transparent or "daytime" mode of the present device is much higher that of prior art structures. This high insulative value minimizes or eliminates the need for artificial space heating day or night. Second, the R value during the "nighttime" mode is also much higher than prior art devices and approaches the thermal insulation value of a Dewar vessel. Further, prior art surfaces which reflect a high percentage of heat radiation generally will not transmit light.

The present invention provides light-transmissive, highly efficient insulating solar block or panel assemblies which selectively transmit the desired degree of light and selectively reflect a high percentage of heat radiation back into the insulated structure.

The solar greenhouse structures of the present invention are constructed from an array of light-transmissive, insulating block assemblies of the present invention. The block assemblies comprising the overall structure are flexibly sealed at the joints therebetween to provide for thermal expansion and contraction. Since the joint seals take up any dimensional variations, there is little or no variance in overall structural dimensions, thus eliminating any tendency to buckle.

Each block assembly houses a movable reflector-light-controlling system which controls the amount of sunlight reaching the growing crops during daylight hours, and in the nightime mode reflects radiant heat from the warmed interior of the structure back into the structure, thus minimizing heat loss in the absence of sunlight.

The control means housed within each modular cellular block is self-contained and communicates with the control means housed within adjacent blocks in a single, simple operation. In addition, regardless of the number of blocks used to construct the solar greenhouse structure of this invention, the system is self-aligning and thus no alignment step is required during assembly or use.

The reflector system or control means serves as a flat plate solar heat collector and can easily be combined with an airflow network that collects and stores solar energy.

The control means or movable reflector system of the present invention may either be timed to move with the sun, thus permitting maximum light to reach the crops growing within the greenhouse structure, or can be timed to be out of synch with the sun, thereby providing any desired degree of shading.

As stated above, the R value of the structures of this invention during the transparent or "daytime" mode is much higher than conventional prior art devices. This high insulative value can entirely eliminate the need for artificial space heating, day or night. The R value during the "nighttime" mode is also much higher than that of prior art devices and approaches the thermal insulation of a Dewar vessel.

Further, in structures such as a greenhouse, even conventional insulated glazing can cause an undesirable excess heat buildup within the structure during the day. However, the design of the light-transmissive, insulating block assembly of the present invention permits the use of materials such as acrylic plastic, which have a high transmissive value for the longer wave heat radiation from the solar warmed interiors of structures. Conventional glass structures are more opaque to the longer wave radiation and tend to hold in the heat.

While the block assemblies of the present invention are ideally suited for use in an array for the construction of large structures such as solar greenhouses, they may also be employed as individual solar panels, or in smaller arrays for a wide variety of uses.

BRIEF DESCRIPTION OF THE DRAWINGS

The present invention will be more readily understood from the following detailed description, taken in conjunction with the accompanying drawings in which:

FIG. 23 is an exploded, perspective view of a drive gear assembly with partially fragmentary, phantom views for clarity.

DETAILED DESCRIPTION OF PREFERRED EMBODIMENTS

Figures 1, 5, 6, 7, 8, 9:
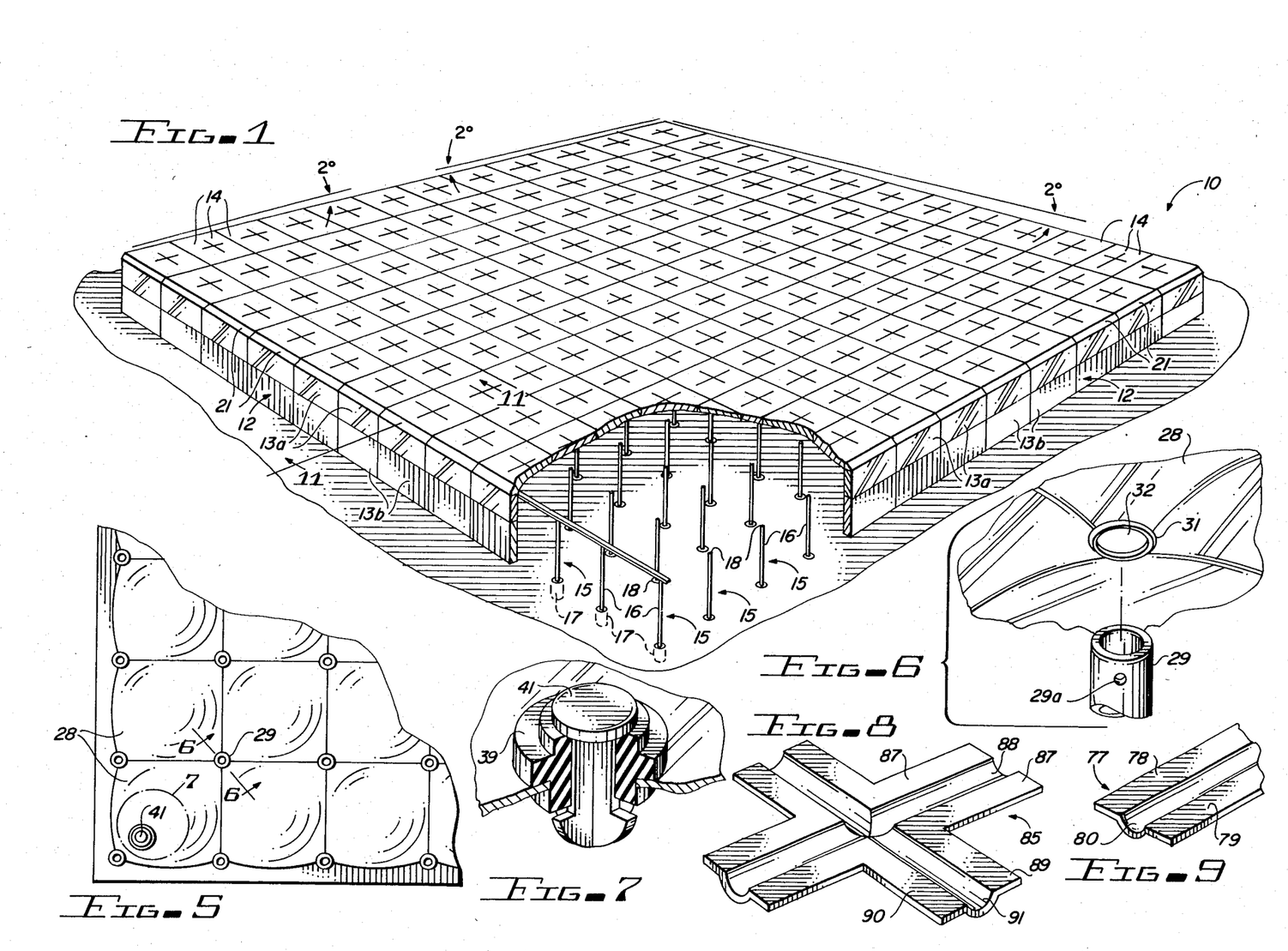
FIG. 1 is a perspective view of a large solar greenhouse constructed from modular light-transmissive insulating block assemblies in accordance with principles of the present invention, with portions cut away for clarity and understanding.
FIG. 5 is a fragmentary bottom view of the block assembly.
FIG. 6 is an enlarged fragmentary exploded perspective view taken substantially along line 6—6 of FIG. 5.
FIG. 7 is a perspective view taken substantially along line 7—7 of FIG. 5 with parts shown in cross section.
FIG. 8 is a perspective view of one type of sealing means for joining adjacent block assemblies.
FIG. 9 is a perspective view of another type of sealing means.

Referring to FIG. 1, solar green house 10 comprises a plurality of generally rigid, fluid impervious barriers including roof 11, upright side and end walls 12 having upper light-transmissive portions 13a and lower opaque portions 13b. Roof 11 is constructed from an array or set of light-transmissive insulating block assemblies or modules 14. The upright walls can also be constructed of light-transmissive insulating block assemblies 14, and may be entirely light-transmissive or entirely opaque, depending upon the size and end use of the greenhouse or it's structure. In larger structures, each block assembly is supported at the four corners thereof by support posts 15. The posts have a bottom end 16 which may either be sunk into the ground or are preferably seated in sunken support member 17, such as a concrete footing extending below ground level, and a top end 18 which lockably engages fitting member 19 (FIG. 4) carried on an interior facing surface 20 of the block assembly 14.

Hollow corner block 21 connects the block assemblies of the roof and upright walls and houses drive bar 105 (FIG. 13) which synchronously controls the movement of the fins as explained below to provide the daytime or nighttime modes of the operation.

As used herein, the term "daytime mode" refers to a mode wherein the fins are positioned to admit either a maximum degree of sunlight or any intermediate degree of light and shade required by the growing crop.

The term "nighttime mode" refers to a mode wherein the fins are substantially parallel to the ground and form a substantially unbroken, planar reflective surface for reflecting radiant heat from the interior of the structure downwardly into the interior so as to conserve heat at night.

Figure 2:
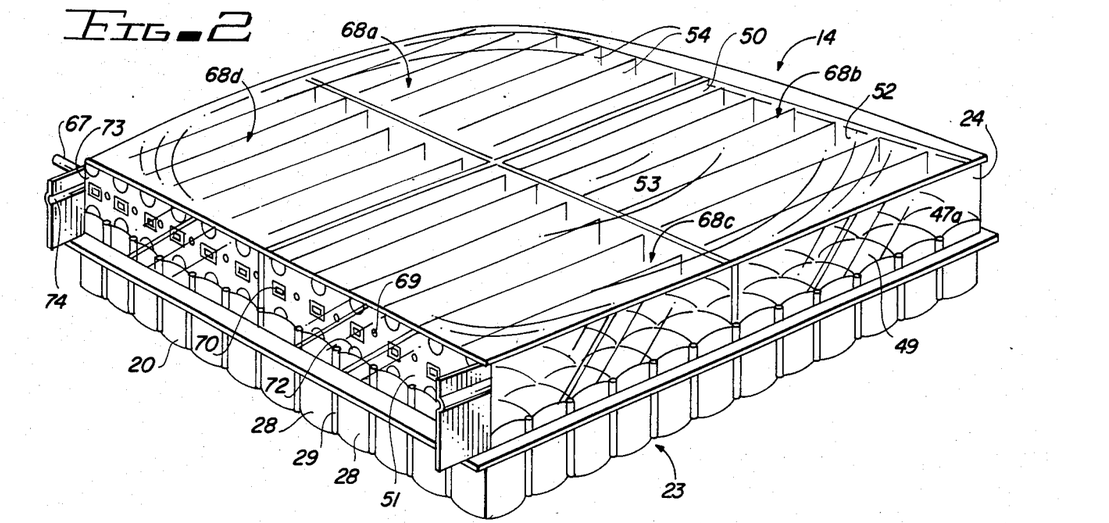
FIG. 2 is a perspective view of a single light-transmissive insulating block assembly.
Figure 3:
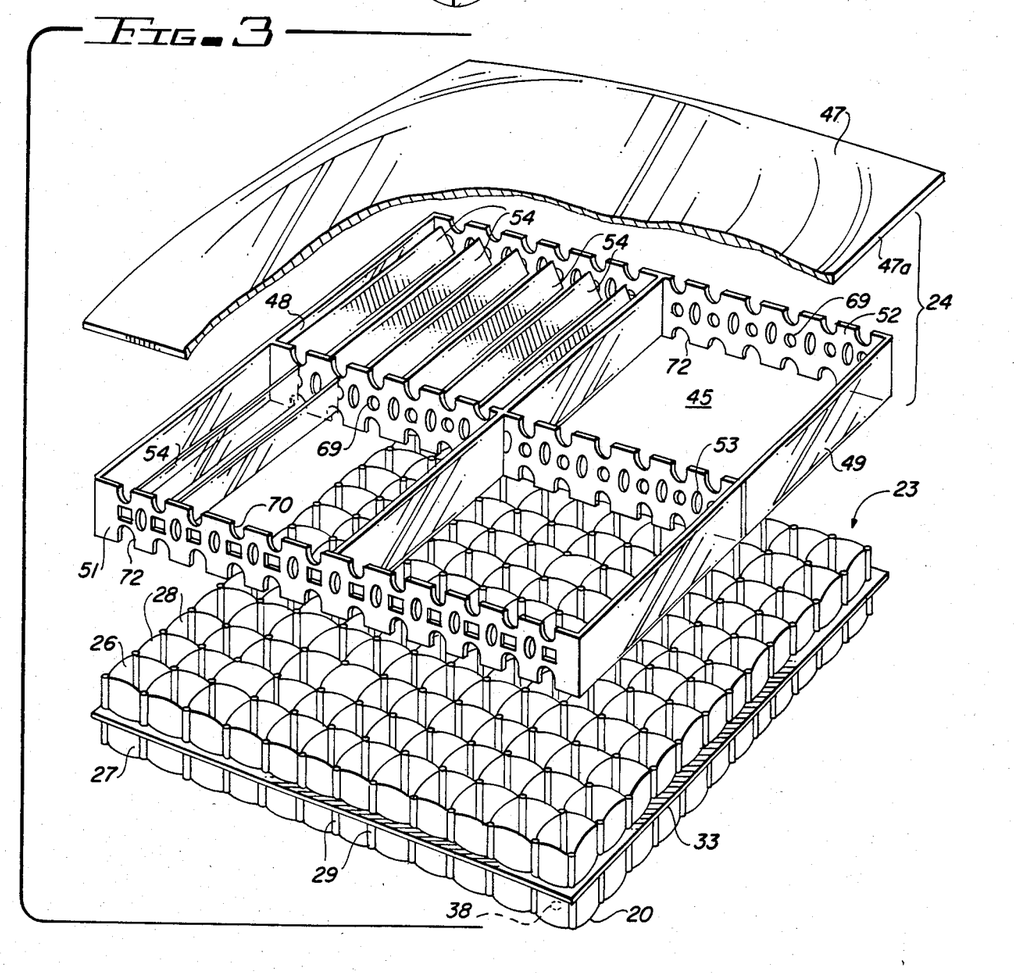
FIG. 3 is a fragmentary exploded view of the insulating block assembly.

As best shown in FIGS. 2 and 3, block assembly 14 has a cellular light-transmissive insulating block 23 and a solar housing 24. In the preferred embodiment, the insulating block is evacuated to provide a vacuum block. Vacuum block 23 is a rectangular block formed from symmetrical, opposing halves (surfaces) 26 and 27, including a lower surface facing the interior of the structure and an upper surface opposite the lower surface generally facing the cover of the housing. Each of the surfaces has arched or dome-shaped, generally convex, load bearing portions 28 for enhanced strength. Light-transmissive tubular support posts 29 further provide load-bearing members to enhance the structural strength of the block. Block 23 may be inexpensively thermal vacuum formed from a light-transmissive, impact-resistant plastic, preferably acrylic.

Support posts 29 serve as bearing pillars for the entire atmospheric force once the block 23 is evacuated. Each support post is provided with one or more slots or perforations 29a (FIG. 6) to insure evacuation of the posts as well as the vacuum block. Halves 26 and 27 can be sealably joined by a number of sealing means such as adhesive, gaskets, heat fusing or ultrasonic welding seals 33 (FIG. 3). The natural tendency of the evacuated block to keep seal or joint 33 together simplifies the sealing process.

For an optimum strength/light transmission ratio, it is generally desirable to have vacuum block walls of from 1 to 3 mm thick with 15 to 25 cm center-to-center pillar or post spacing. The overall thickness of vacuum block 23 is not critical for its primary function of zero conductivity. As a general rule, however, while thinner blocks are less expensive, a thick block permits a thick section of conventional insulation in the joint areas. Generally speaking, blocks ranging from 1 to 30 cm in overall thickness preferably 5 to 15 cm are suitable.

Referring to FIG. 5, the base circle of each dome section 28 should be at least $C\sqrt{2}-d$ and may be $C\sqrt{2}$ or larger where C=center to center spacing of the support posts or pillars and d=the diameter of the posts or pillars.

Figure 10:
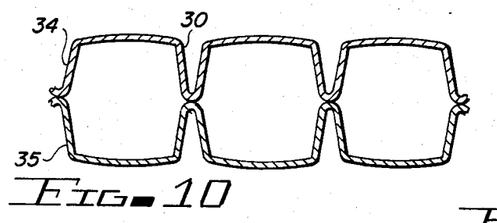
FIG. 10 is a cross-sectional view of a cellular block.

In lieu of support pillars or posts 29, symmetrical opposing halves 34 and 35 can be supported by interconnecting fingers which provide spots or bearing points 30 along their points of contact as shown in FIG. 10.

Figure 11:
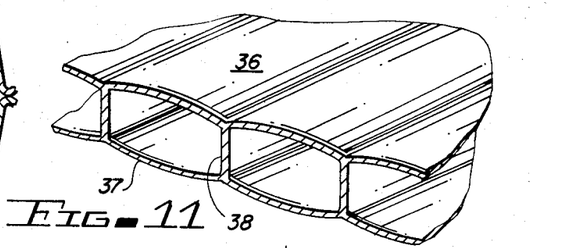
FIG. 11 is a cross-sectional view of another type of cellular block.

As shown in FIG. 11, a further alternative is to provide an extruded unitary (one-piece) molded cellular insulating block 36 wherein each arcuate or domed-shaped section 37 are separated and supported by ribs 37a.

Regardless of the design of insulating block means 23, at least one internal cavity or vacuum chamber 25 is defined and encapsulated by said block means for insulating the interior of the structure formed by the array of insulating block means.

In the case of relatively large structures, in addition to multiple domes or arched segments 28 on the outer surface of block means 23, the overall cellular block may be slightly convexly domed to prevent sagging and to further insure the structural integrity of the block.

In instances where less insulation is needed, block means 23 may be only partially evacuated, or may either be left wholly unevacuated or filled with an insulating fluid other than air, such as freon, or other gases or liquids. In instances, where the cavity 25 defined by block means 23 is not evacuated, there is less need for reinforcing the block at periodic points. An evacuated cavity provides the optimum insulation and is preferred.

As shown in FIG. 3, evacuation port or passageway 38 is provided in surface 27 of cellular block 23 for the removal, evacuation or addition of fluid therefrom or thereto as desired. A sealing gasket 39 is sealed around port 38. Port closure means such as a plug 41 or a valve or other closure means well known in the art is provided to normally close the port. A port or valve utilizing the vacuum's self-sealing tendency would be the simplest and least expensive. Preferably, port 38 is self-operating, opening whenever the pressure outside (within the vacuum hose line) is lower than the vacuum block pressure. Port 38 also serves for further evacuation in the field in the event of air infiltration over time or fluid addition. In cases where the integrity of the seam seal is deemed sufficient, a simple heat-sealable port may be substituted for the valve and sealed after a vacuum has been drawn.

The insulating block means employed as one component of the high insulating block assemblies of the present invention may also be used in a wide variety of applications where light-transmissiveness is not critical, such as in building insulation. In such cases, the blocks can be made of lower cost, non-transparent plastic or other materials and additionally may be vacuum metalized, or otherwise reflectively coated to provide maximum insulative properties.

Solar housing 24 (FIGS. 2 and 3) as well as the cellular block are preferably formed from a light-transmissive, impact-resistant plastic which retains its structural strength and integrity when exposed to sunlight. Housing 24 has a light-transmissive cover 47 which is preferably slightly convexly domed (arched) and which seats on the upper surface of cellular block 23 and cooperates with the cellular block to form a fluid circulation chamber 45 therebetween and a plurality of support walls or members 48–53 extending between and separating cover 47 and block means 23 to form a fluid flow circulation chamber therebetween. Housing 24 has first and second spaced-apart parallel side walls 48 and 49, and optional central intermediate support wall 50 spaced apart and parallel to side walls 48 and 49 and positioned therebetween, front wall 51, rear wall 52 and an optional end lateral wall 53 normal (perpendicular) and criss-cross to the central wall 50.

Figures 12, 14, 15, 16:
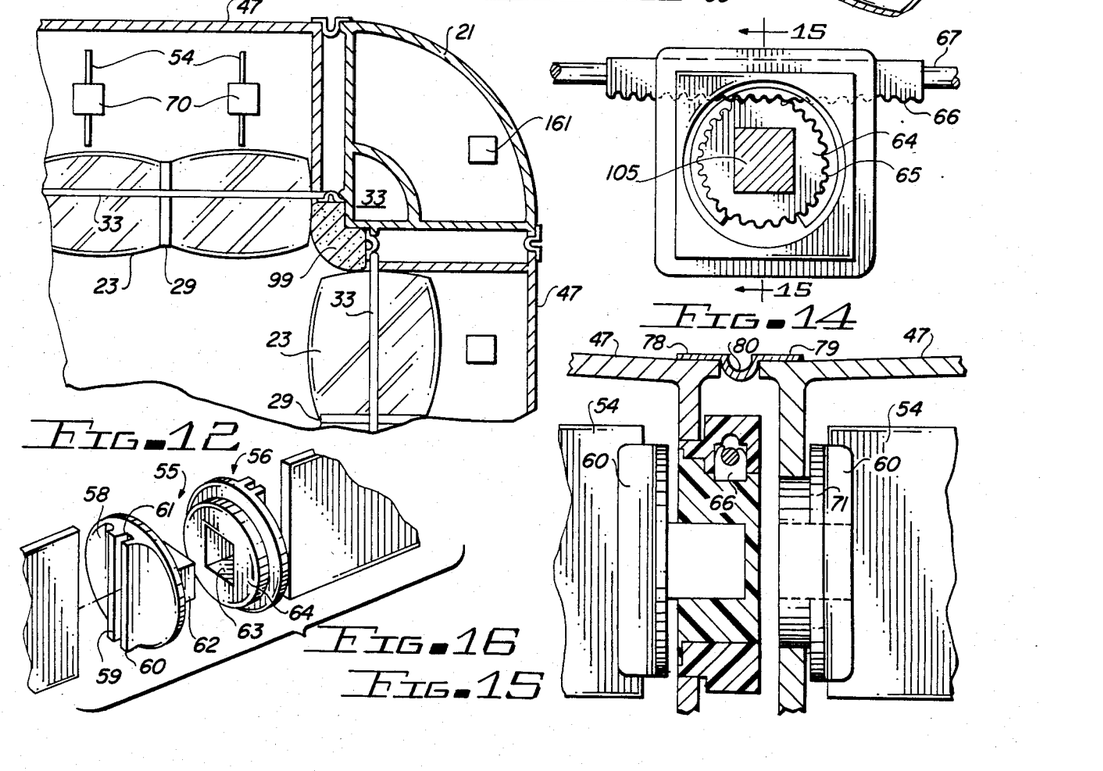
FIG. 12 is a cross-sectional view taken substantially along lines 11—11 of FIG. 1.
FIG. 14 is a cross-sectional view taken substantially along lines 14—14 of FIG. 13.
FIG. 15 is a cross-sectional view taken substantially along lines 15—15 of FIG. 14.
FIG. 16 is an exploded view of adjacent fin connectors.

A set or plurality of parallel, enlongated fins 54, also referred to as reflectors, deflectors, vanes or blades, extend between and are pivotally and rotatably connected to walls 51–53 by fin connectors 55 and 56 (FIG. 16). The fins are spaced apart and are parallel to side walls 48 and 49 and central support wall 50. The fins are generally planar (flat) and extend from front wall 51 to rear wall 52, or in the case of large structures as illustrated in FIGS. 2 and 3, a first set of fins may extend from front wall 51 to central end wall 53 and a second set of fins may extend form central end wall 53 to rear wall 52. While flat fins are preferred, in some instances it may be desirable to use curved fins.

Cover 47 and support walls 48–53 are preferably integrally molded and connected and are preferably constructed from a light-transmissive, impact resistant plastic material which retains its structural integrity when exposed to sunlight, heat and cold.

Figure 26:
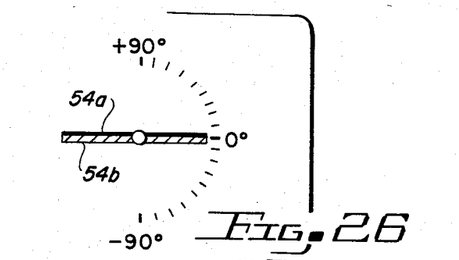
FIG. 26 is an elevational side view of a fin in the night time mode.
Figure 27:
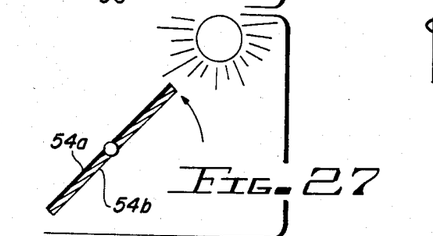
FIG. 27 is an elevational side view of a fin in a partially open position.
Figures 28, 29, 30, 33:
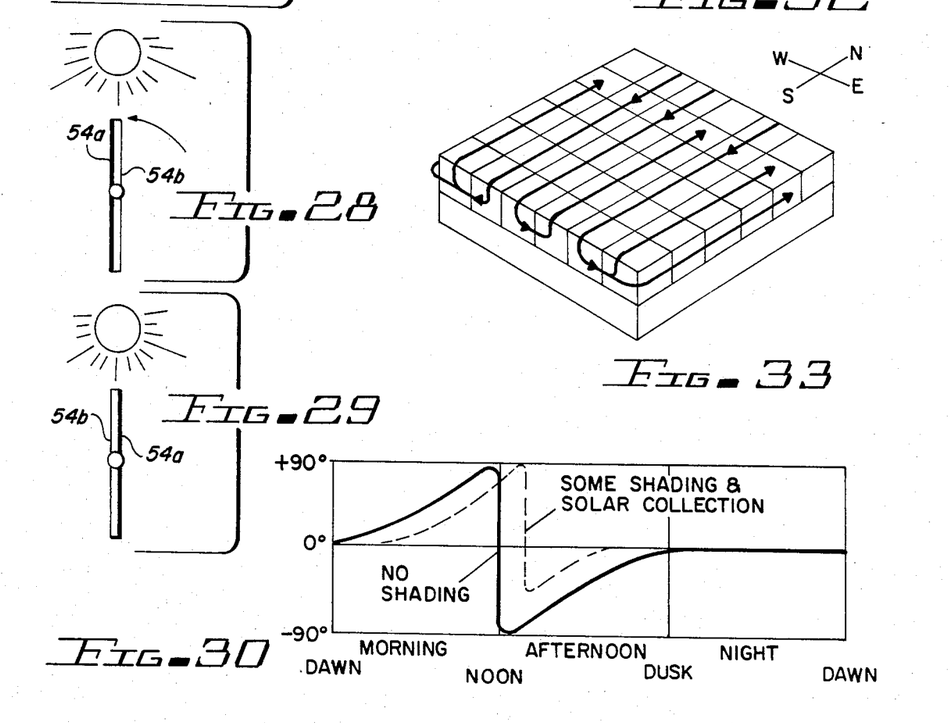
FIG. 28 is an elevational side view of a fin in the fully open daytime mode.
FIG. 29 is an elevational side view of a fin in the fully open reversed daytime mode.
FIG. 30 is an xy graph of the amount of shading provided as the fins rotate over a 24 hour period.
FIG. 33 is a perspective view of a block assembly showing an alternative air-flow pattern.

The fins or reflectors are thin (preferably 1 mm or less) long, narrow, rectangular vane members and are made of a shiny reflective material such as polished aluminum, vacuum metalized plastic or any other suitable rigid material that can be made highly reflective. The fins are held pivotally and rotatably along their longitudinal center between front and rear walls 51 and 52 as discussed hereabove. Fin means or reflectors 54 may be positioned to a fully open position substantially parallel to the sun's rays to permit maximum passage of light into the circulation chamber and the cellular blocks and hence the structure, (FIGS. 28 and 29) or to a fully closed position substantially parallel to the plane of the blocks to form a substantially unbroken reflective surface facing the interior of the structure to substantially block and prevent passage of sunlight and to provide the nighttime mode wherein radiant heat is reflected back into the structure through the vacuum block, (FIG. 26) and intermediate partially opened position therebetween and at an angle of inclination relative to the sun and the cellular block for particularly permitting passage of light through the circulation (flow) chamber and cellular blocks (FIG. 27). While the fins may have two reflective surfaces, it is preferred to have one black or otherwise non-reflective, heat-absorbing side 54a and one reflective or shiny side 54b. In that way, when the fins are used for partial shading, the radiant heat from the sunlight being shaded from the growing crops will be absorbed by the non-reflective, darkened surface and the solar energy collected thereon may be put to use within the greenhouse structure if desired. FIG. 30 illustrates the movement of the fins over a 24 hour period and charts the degree of shading provided at each state of fin movement.

The fins pivot on and are driven by fin ends 55 and 56, sometimes referred to as connector axles. The fin ends are preferably a molded plastic. Almost any plastic material will suffice, but a self-lubricating plastic such as nylon, polytetrafluoroethylene (such as that sold under the tradename TEFLON ®), a linear polyoxymethylene type acetal resin (such as that sold under the trademark DELRIN ®) and the like, is preferred. All fins are identical and have a male fin connector 55 at one end and a female fin connector 56 at the other. Fins 54 and fin connectors 55 and 56 are coaxial and are sometimes referred to collectively as fin means. Fin connectors 55 and 56 are shown in mating alignment in FIG. 16. The fins may be integrally molded with fin connectors 55 and 56 as integral parts thereof, or fin connectors 55 and 56 may be molded separately and simply affixed to the end walls of fin 54. When more than one insulating block 14 is used to form an array to construct, for example, greenhouse 10, the fins in each block are interconnected in such a way so as to be synchronously positioned throughout their 180° path of movement.

Referring to FIG. 16, each of the connectors 55 and 56 has a disc-shape wall 58 with protruding, grasping fingers or clamps 59 and 60 having a fin-receiving slot 61 therebetween for receiving and firmly grasping the ends of the fins. The male connector 55 has square shaft 62 or male member, which interlockingly engages and matingly fits into a square hole or socket 63 in the circular hub 64 of the female connector or drive-bearing 56. The shaft and socket provide interconnecting or joining means for adjacent connectors.

When fin connectors 55 and 56 are mateably and interlockingly engaged as shown, the fins rotate synchronously and in unison.

It is important that a sliding tolerance along the longitudinal axis of the engaging fin connectors 55 and 56 be provided. The dimensions of the overall fin means 54 allow for thermal expansion and contraction. Thus the sliding tolerance of fin connectors 55 and 56 helps prevent buckling during thermally induced dimensional changes within either the fins or the housing.

The fins are contained in housing 24 which may have any number of fins in series or parallel. For illustrative purposes, FIG. 2 shows an arrangement with twelve parallel, spaced apart rows of two fins in series contained in four quadrants 68a, 68b, 68c, and 68d. The number and size of fins and sections with housing 24 will depend upon the structural characteristics of the construction materials and the desired overall size of block assembly 14. The embodiment illustrated in FIGS. 1-3 may be conveniently constructed in relatively large units, i.e. 8-12 feet squared. For maximum light transmissiveness, economy and weight, housing 24 is preferably constructed of a rigid, clear (transparent) material which retains its structural integrity when exposed to sunlight and temperature extremes. Acrylic is the presently preferred construction material. Other plastics can be used, however, where maximum light transmissiveness and or economy are not important factors, or other suitable materials may be used, such as tinted, or translucent materials. Housing 24 may be formed as a single piece or assembled from separately molded of fabricated parts.

The fins are controllably rotated within housing 24 by means of drive bearing 71 (FIGS. 19-23). Drive bearing 71 is preferably a rack and pinion mechanism consisting of three parts, rack 110, pinion 111 and housing 112. The rack, pinion and housing are preferably molded plastic parts. While nearly any plastic may be employed, a strong, self-lubricating plastic such as nylon or Delrin is preferred. Pinion 111 rotates within housing 112 with exactly 180° of freedom. The 180° travel path limits the travel of fins 54 precisely between straight vertical with one silver or reflective surface 54b/black or non-reflective surface 54a orientation to straight vertical with the opposite orientation (FIGS. 28 and 29) for continued travel over a twenty four hour period.

Pinion 111 has a square hole 113 through its center of the same dimensions as aperture 63 of female fin end 56. Thus pinion 111 mates with and drives male fin end 55. And, as in the other fin end joints, this joint has longitudinal sliding tolerance to compensate for any thermal expansion. Stoplimit aperture 117a in the front wall of the drive bearing housing automatically aligns the 180° travel precisely. If desired, in factory assembly, the drive bearing housing may be adhesively bonded to the wall, or designed to snap into place.

Rack 110 has a length which is at least ½ the pitch circumference of pinion 111 and drives pinion 111, converting its linear motion ultimately to rotary fin motion. Rack 110 fits around common drive bar 117 (common to all other drive bars in block assembly 14), forming a friction grip that can slide at, but not less than, some force greater that the normal force required to rotate the fins. This slip joint prevents a total block, or even multi-block, malfunction in the event that one fin should jam. In the event of a fin jam, the drive bar simply passes through the involved rack, while driving all others. Equally important, the slip joint cooperates together with the 180° rotary limit 117a to create precise and continual self-alignment of all fins. When all fins are in alignment and synchronized in their orientation, all drive bearings will hit their limits simultaneously. The drive motor may also be programmed to stop at that point. If one of more fins are not in line with the rest, such fin(s) will not hit their limit synchronously with the properly aligned fins. In the event a fin is ahead of the drive sequence, it will be stopped by its limit before the others, in which case the drive bar 117 will slip through its rack, driving all correct fins to their limit. At that point, all fins will be in the same alignment. If the out-of-synch fin were behind in the sequence, it would not align on the first stroke, but would align on the return stroke.

This self-aligning feature is an important aspect of the present invention as it solves any problem of thermal expansion which may cause alignment errors. In addition, manufacture and installation of a single, or an array of block assemblies is greatly simplified. At no point in either process is it necessary to mechanically align the fins. Fins 54 will self-align in the first full reciprocal drive stroke, and as discussed above, will remain in alignment through the self-corrective, self-aligning features of the drive means.

Figures 13, 17, 18, 19, 20, 21, 22, 24:
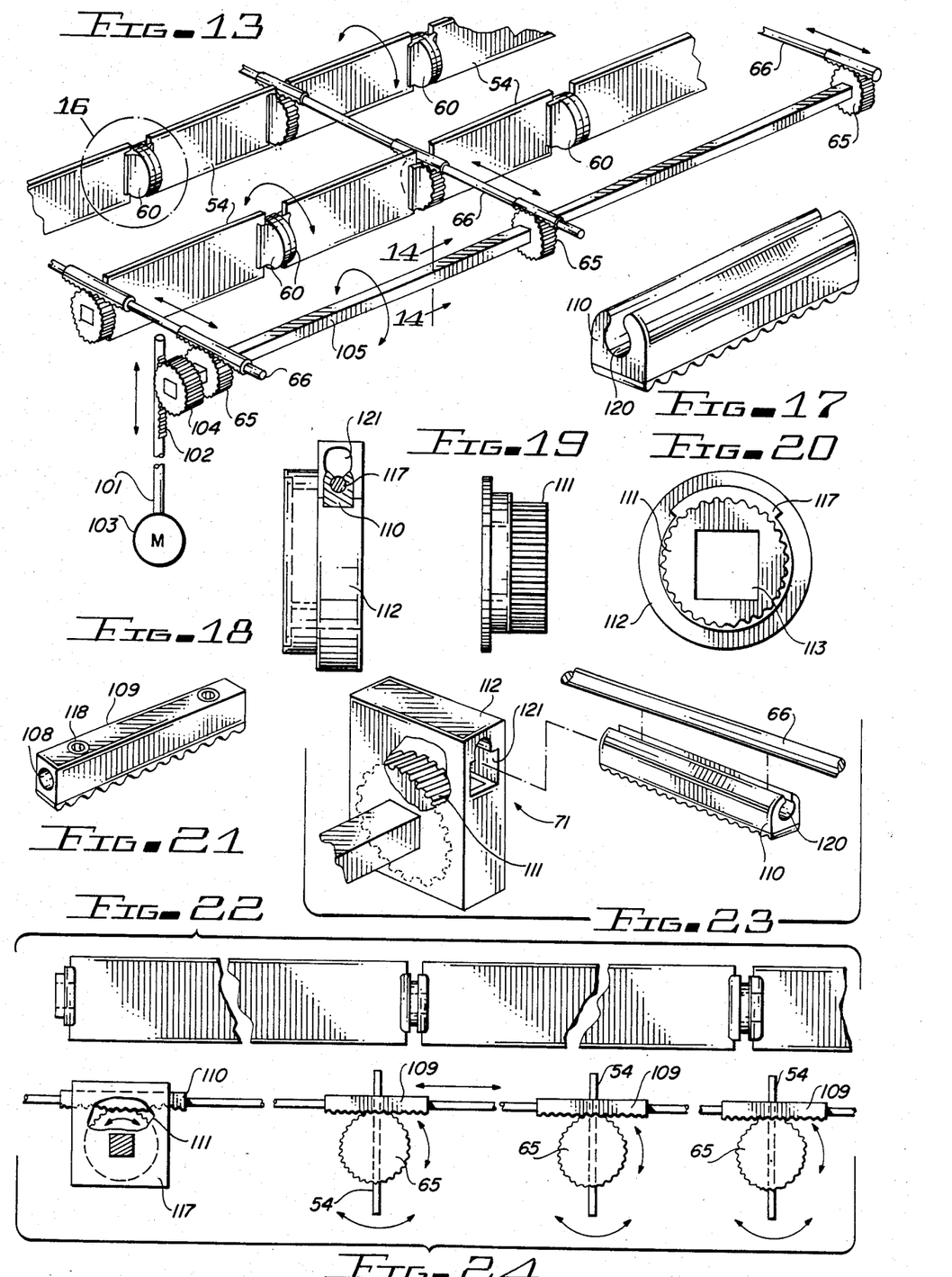
FIG. 13 is a perspective view of one type of control means.
FIG. 17 is a perspective view of a master drive gear rack means.
FIG. 18 is a side view of a master drive gear housing.
FIG. 19 is a side view of a master drive gear pinion.
FIG. 20 is a front view of the master drive gear pinion of FIG. 19.
FIG. 21 is a perspective view of a common drive gear rack.
FIG. 22 is a perspective, partially fragmentary view of a plurality of connected fins.
FIG. 24 is a front view of a drive assembly.

For ease and convenience of manufacture and assembly, it is preferred that racks 110 be "open-sided" and contain groove or channel 120, permitting drive bar 117 to be snapped into place. Housing 112 includes aperture 121 which is of sufficient size to a provide a space which admits drive bar 117 prior to snap assembly thereof prior to assembly with the rack (FIGS. 18 and 23.) Drive bar 117 may be inserted through all such housing openings on the block, and then snapped into all racks. Once the three-piece drive bearing is assembled, the rack cannot fall out because of the rotary limit of the pinion. Rack 109 (FIG. 24 receives drive bar 117 through aperture 108, and includes set screw means for securing the drive bar within the rack and limiting slippage. Rack 109 is employed in the drive array as shown in FIG. 24 with common drive gears 65.

Figure 25:
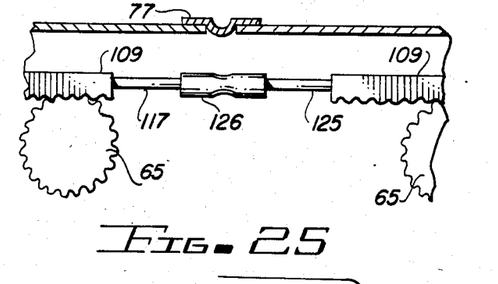
FIG. 25 is a front view of a section of drive assembly showing the connection between drive bars of adjacent block assemblies.

Drive bar 117 may be of any rigid, straight wire or rod means having a sufficient diameter for suitable strength. Galvanized or stainless steel rods of from approximately 2 to 4 mm in diameter are preferred for larger structures. The length of drive bar 117 is slightly shorter than the overall width of modular block assembly 14. The drive bar may be factory assembled or installed in the field. In practice, as the blocks are put in place, the drive bars 117 of adjacent block assemblies are joined in rows, by, for example, a crimped steel tube 126 (FIG. 25) or any other conventional joining means. The set of drive bars can be driven synchronously with a variety of linkage configurations, employing the master drive bearing 71 as shown in FIGS. 13 and 24.

In practice, a master drive bar 101 (FIG. 13) with rack teeth 102 is driven by a linear actuator or motor 103. If desired, a worm gear may be substituted for the rack, permitting the use of a rotary servo motor in place of a linear actuator or other suitable drive means. Rack teeth 102 meshingly engage and drive pinion gear 104. Gear 104 is fixedly connected to driven pinion gears 65 by square drive rod 105. The master drive bar 101 drives the pinion gears 65 in unison to synchronously dirve the fins to a fully open, partially open or fully closed position.

There are three chief differences between the regular drive bearings 71 and common drive bearings 65. The common drive bearings may be made of stronger material such as steel, brass, zinc, etc. Racks 109 are solidly joined to drive bearings 65 by fastening means such as set screw 118. In addition, the common drive bearings are not limited to 180° of travel. The common drive bearings are generally mounted in the same plane and line as the bearings they service, and are in a line with each other perpendicular to the line of fin drive bearings. The common drive bearings are rotated synchronously with a common bar 105 which preferably has a square cross-section. This rotary bar 105 (FIG. 13) is consequently driven by a systems master drive bearing 104. The rack of drive bearing 104 is driven in a controlled reciprocating motion, timed to control the fin alignment as desired, by any appropriate conventional linear actuator mechanism 103. A structure with both sides and walls, such as greenhouse 10 may require several separately controlled linear actuators for the different planes of the structure if all sides and walls include fins.

As described above, housing 24 has side walls 48 and 49, front wall 51, rear or end wall 52 and top or cover 47. For structural purposes, more than one compartment or fluid flow chamber 45 (FIG. 3) may be provided within housing 24 such as that illustrated in the drawings by the addition of central support wall 50 and central end wall 53. Cover 47 may include an overhanging lip or flange 47a (FIGS. 2 and 3) to partially cover drive-means receiving chamber and allow for flexible sealing of adjacent blocks.

Rear wall 52 (FIG. 3) and parallel walls between the rear wall and front wall 51 have a series of round holes 69 which pivotally receive the disc-shaped walls 58 (FIG. 16) of the fin connectors 55 and 56 and serve as pivot points for the fins. The centers of holes 69 are in alignment and are spaced equally at a distance nominally larger than the width of the fins so that the fins can freely rotate without interruption. The disc-shaped walls can also rotate within drive bearings 71 (FIG. 15) mounted within the enlarged holes in the walls, if desired. Square holes 70 in front wall 51 house and align drive bearings 71 discussed in detail below. Both front wall 51 and rear wall 52 (and all parallel walls in between) have large U-shaped channels or air passageways 72 (which may be U-shaped or any other convenient configuration) communicating with the circulation chamber 45 of adjacent modules. Air passing through the passageways and circulation chambers remove heat from the modules.

Figure 31:
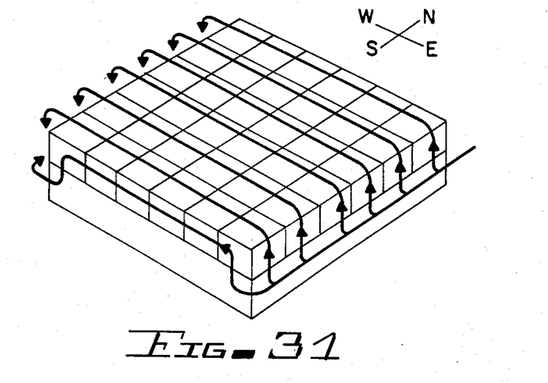
FIG. 31 is a perspective view of a block assembly showing one air-flow pattern.
Figure 32:
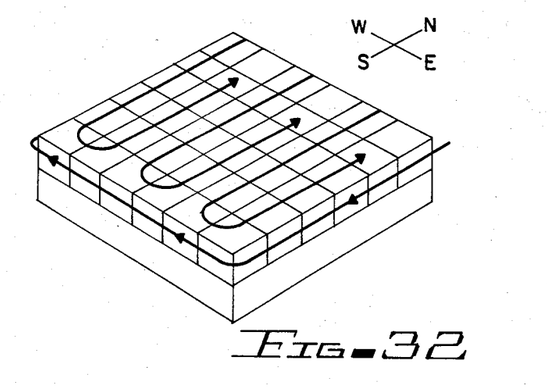
FIG. 32 is a perspective view of a block assembly showing an alternative air-flow pattern.

Side walls 48 and 49 are perpendicular to front and rear walls 51 and 52 and are solid so as to prevent air flow through them. Thus, as shown in FIGS. 31-33, air flowing through the assembled block 14, or an array of assembled blocks is directed in a path parallel to and along the surface of fins 54. The air flow, as stated above, serves to remove the collected solar heat from the fins and hence from the modules.

Figure 4:
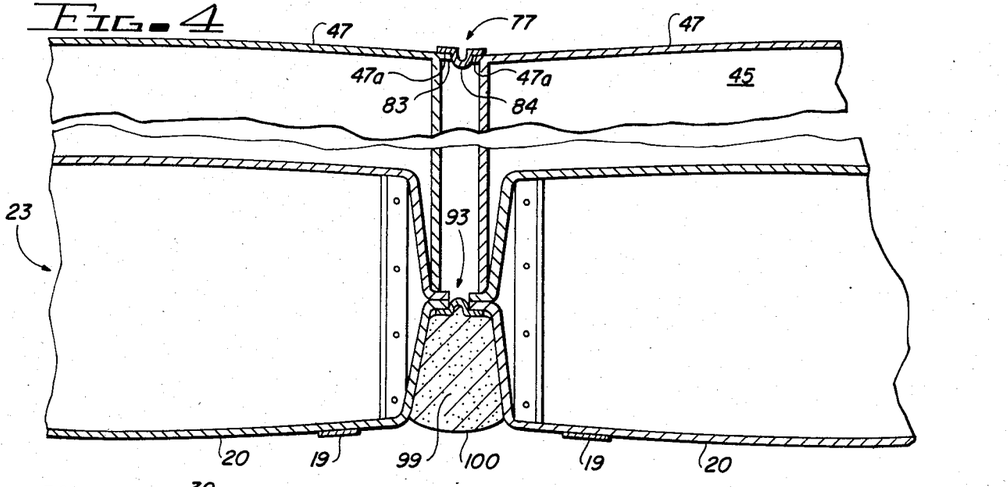
FIG. 4 is a fragmented cross-sectional view of adjacent block assemblies.

Referring to FIG. 4, in an array of block assemblies 14, as depicted in FIG. 1, it is important to seal the spaces between the end of the side wall of one block from the end of the side wall of the adjacent block to create intercommunicating, individual fluid flow circulation chamber 45 one block wide in width within the array. Side walls of adjacent block are sealed with flexible sealing end flap means 73 (FIG. 2). Flexible sealing means 73 is preferably light-transmissive and is sealably joined to side wall 48 or 49 by adhesive or other suitable fastening means. End flap sealing means 73 is provided with an aperture which is preferably a horizontal slot 74 adjacent one end thereof for receiving drive bar 67 therethrough, and is preferably curved slightly inwardly to maintain positive contact with the side wall of an adjoining block assembly 14. Flap means 73 are secured to only one of the two block assemblies they contact or cooperate with to permit variation of the block assembly spacing caused by thermal expansion or contraction.

Preferably, end flap sealing means 73 are located at all joints along the entire length of the housing side walls so that all joint spaces are blocked from transverse air flow.

The block assembly array must be sealed at all joints, both at the seams between insulating block means 23 as well as at cover edges 47a (FIG. 4). Any number of sealing arrangements may be used in the practice of the present invention. For example, any conventional waterproof, ultraviolet light-resistant, flexible tape with adhesive suitable for the plastic material used to fabricate the block assemblies, may be employed. However, since it is important to mount block assemblies 14 on support posts so that each block assembly is slightly spaced apart from adjacent block assemblies it is preferred to use the sealing means illustrated in FIGS. 4, 8 and 9.

Referring to FIGS. 4 and 9, sealing means 77 is a flexible tape means having first and second elongated, laterally opposed flanges 78 and 79 with a U-shaped member or bight 80 disposed therebetween and connected thereto. Flange 78 sealably engages lip 47a of cover 47 of one block assembly and flange 79 sealably engages lip 47a of an adjacent block assembly. Flexible bight 80 permits flexing of the array of blocks during thermal expansion and contraction.

Turning to FIG. 8, criss-cross corner sealing means 85 has a first pair of elongated, laterally opposed flanges 86 and 87 spaced apart by flexible U-shaped members of bight 88 and a second pair of elongated, laterally opposed flanges 89 and 90 spaced apart by flexible U-shaped bight 91 perpendicular to said first pair of opposed flanges 86 and 87 and bight 88.

The distance between block assemblies 14 in solar greenhouse 10, or any other structure, is a function of the overall size of each block assembly, the coefficient of thermal expansion of the light-transmissive material employed to construct the overall structure, the operating temperature range of the block assemblies and the ambient temperature during field construction. Generally speaking, the block assemblies are positioned in any building array so that adjacent block assemblies come just short of touching at their highest expected operating temperature.

Spacing 93 between adjacent insulating block means 94 and 95 (FIG. 4), and specifically between exposed surfaces 20 and insulating block seams 33 (FIG. 4) may be filled with any suitable, conventional sealing material to form a plug 99 therebetween. Preferably, a flexible synthetic foam is used to form plug 99 and the plug may be provided with a reflective outer or exposed surface 100 which further maximizes reflection of radiant heat to the interior of the greenhouse or other building structure.

Figure 34:
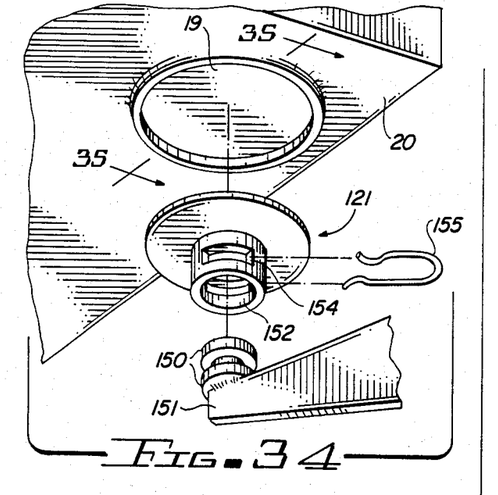
FIG. 34 is a perspective, exploded view of a bracket assembly.
Figure 35:
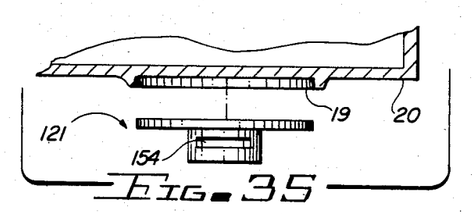
FIG. 35 is a side view of the fitting bracket.
Figure 36:
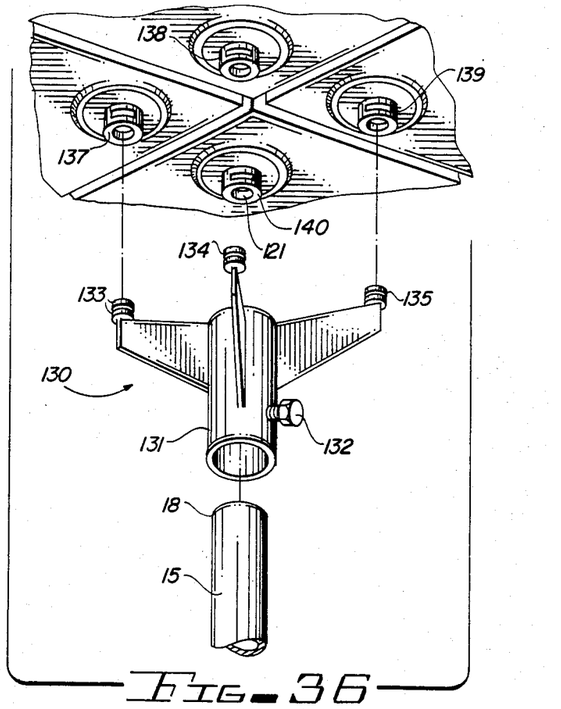
FIG. 36 is an exploded view of a four-pronged ceiling bracket for supporting corners of four adjacent block assemblies.
Figure 37:
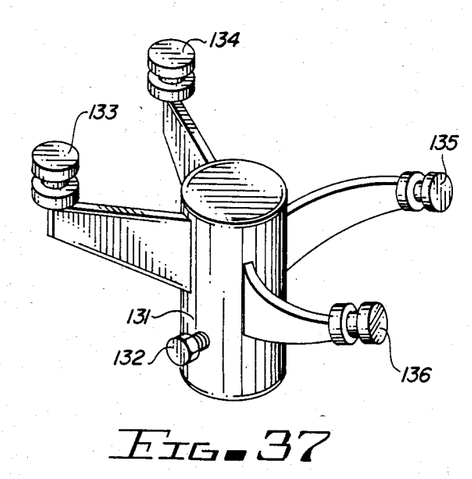
FIG. 37 is an enlarged, perspective view of a wall or ceiling support bracket. support bracket.

Block assembly 14 may be provided as a complete working assembly and can be used at the construction site in arrays covering an indefinitely large, horizontal, sloped or vertical area utilizing simple materials and unskilled labor. As described briefly above, bottom surface 20 of each block 14 carries a socket-like fitting member 121 at each corner thereof. (FIGS. 34-36) Fitting members 121 are affixed to a form-fitting depression or member 19 in bottom surface 20 by adhesive, heat or mechanical fastening means (not shown). Socket members may be steel, aluminum or any suitably strong plastic material. Steel is preferred in large structures.

Fitting member 121 engages a joining device which connects the upper end 18 of support post 15 to fitting member 19. Depending upon it's ultimate use within the structure being supported, the joining devices may be of varying configurations. As shown in the drawings, joining device is typically a four-pronged bracket 130. Bracket 130 includes a hollow post 131 which fits over the top end 18 of support post 15 and is lockingly engaged therewith by securing means 132. Prongs 133-136 lockingly engage sockets or securing means 137-140 which are secured to depressions 19 located adjacent each corner of four adjacent block assemblies. Thus a single support post supports the corners of four adjacent block assemblies in the array.

Securing means 132 includes one or more prongs 133-136. Each prong terminates in fitting element 156 which, in the preferred embodiment includes spaced-apart flanges 150 and 151. The flanges are received in channel 152 of fitting member 121. Flanges 150 and 151 define groove 153 which is in alignment with aperture 154 of fitting member 121 when the prongs are fitted within fitting member 21, and are lockingly engaged therein, with, for example locking pin 155. At corners and edges of greenhouse 10, the brackets may have one, two or three prongs, depending upon the area to be supported.

The vertical support posts 15 may be of any conventional structural pipe material. Posts 15 are preferably arranged in a square matrix with center-to-center distances coordinated with the width of the block assemblies. Each bracket 130 may be screwed, set-screw locked, or pinned to the top of its respective support post 15. The prongs are then pinned, clipped, or otherwise secured to the sockets. The relative dimensions of the mating parts and holes should have sufficient tolerance to permit thermal expansion and contraction within the range computed for the particular plastic material used in the construction of the block assemblies and the anticipated temperature range. While the block assemblies may be supported in other fashions, the preferred embodiment depicted in the drawings and described above has the advantage of providing a fast and self-aligning method for correctly spacing the blocks. A small amount of play in the support posts will permit the posts to be brought into precise position as the blocks are installed to provide the desired structure.

Figure 38:
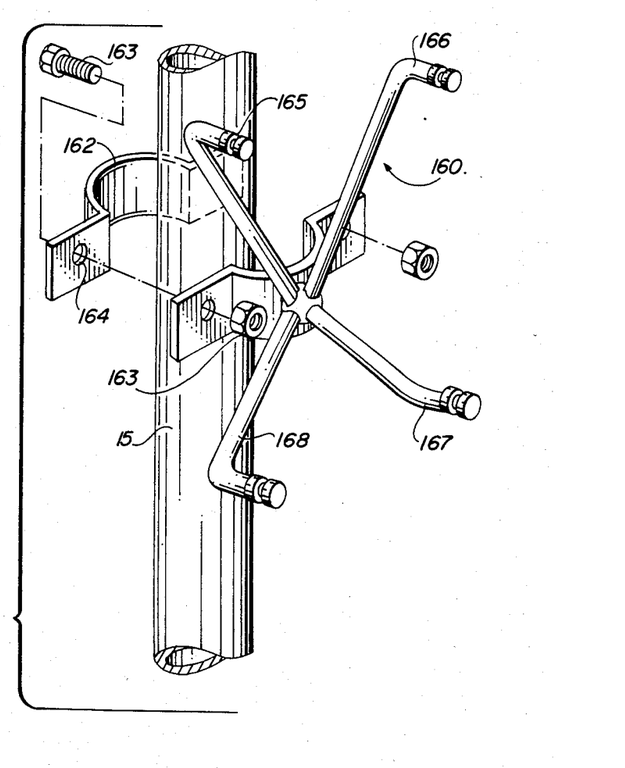
FIG. 38 is a perspective view of a bracket which supports side walls.

As will be apparent to those skilled in the art, bracket 130 is most suitable for horizontal and sloped surfaces. In the case of vertical arrays, such as side walls, bracket 160 is carried on a first clamp 161 which fits around one half of a side of post 15 and engages and is affixed to a second clamp 162 by bolts 163 which are received through holes 164 and secured by nuts 163a. While shown with four prongs 165-168, bracket 160 may carry one to four prongs depending upon the location and number of blocks to be supported.

When an array of blocks is used to form a structure such as a solar greenhouse, all joints must be sealed, both at the vacuum block seams and the reflection section housing tops as described above. A conventional waterproof, ultraviolet resistant flexible tape with adhesive suitable for the plastic material of the block may be used; however, it is preferred to use the sealing tape depicted in FIGS. 8 and 9 and described above as the preferred sealing means of this invention conveniently permit both expansion and contraction of the blocks. It is preferred to have the spacing between blocks and the width of the vacuum block seams, as small as possible so that the non-vacuum-insulated area is the smallest possible percentage of the total area covered by the structure.

When one plane of block assemblies are joined to another plane of block assemblies, such as an adjoining ceiling and wall, special edge blocks and corner blocks are employed. As best shown in FIG. 12, edge block 21 do not contain the moveable reflective surfaces or fins. The edge blocks are roughly a ¼ cylinder and the corner blocks are roughly a ⅛ sphere.

The edge blocks may either be air-flow or non-air-flow types. Non-air flow edge blocks are positioned parallel to a fin array and carry square sockets 161 which receive common drive bearings while air-flow edge blocks would not include square sockets. If desired, edge blocks may carry an angled face which would permit, for example, a roof array sloped at a shallow drainage angle to be joined to a vertical wall array. In such a case, the rows of blocks in the wall array are preferably slightly staggered, in correspondence to the roof angle, and would require mounting brackets with correspondingly offset prongs. In addition, the side walls of such air flow blocks would be slightly slanted so as to remain perpendicular to the slope, maintaining the collinearity of the rotary axes of common drive bearings.

Corner blocks (not shown) generally do not require any air flow, but may include a square socket on each of their three flat faces making them universally receptive to a master drive bearing.

It should be noted that master drive bar 105 differs from common drive bars 66 and 117 (FIGS. 13 and 24) in that the master drive bar must travel through sealed blocks, whereas the common or fin drive bars operate outside the blocks in the joint regions between adjacent blocks. Hence the fin drive bars do not significantly add additional light blockage.

Preferably, greenhouse 10 is pitched as shown in FIG. 1 to facilitate water removal by gravity runoff. A slight (2°) pitch in two directions is sufficient for this purpose.

Although embodiments of the invention have been shown and described herein, it is to be understood that various modifications and substitutions may be made by those skilled in the art without departing from the novel spirit and scope of the invention.

The invention claimed is:

1. A light-transmissive solar insulating block assembly adapted to being assembled in arrays to form at least a portion of a structure having an exterior solar absorbing surface and an interior chamber to be heated comprising:

light-transmissive insulating block means defining at least one internal cavity substantially capable of maintaining a vacuum for insulating the interior chamber of the structure to be heated;

a housing supported on the block means having a light-transmissive cover providing an exterior surface and a plurality of support walls including a front and a rear wall extending between and separating said cover and said block means, said housing cooperating with said block means to define a circulation chamber therebetween, said front and rear support walls defining a plurality of passageways for ingress and egress of air into and out of said chamber; and fin means having two ends pivotally extending between the front and the rear wall of said housing for reflecting radiant heat back into said structure and controlling the amount of light passing through the chamber, a male fin connector attached to one end of the fin means and a female fin connector attached to the other end of said fin means, said connectors pivotally connecting the fin means to said housing, said connectors adapted to interlockingly engage and mate with connectors of adjacent modules in an assembled array.

2. A block assembly in accordance with claim 1 wherein said fin means includes reflecting means for reflecting radiant heat back through said block means and into the interior of said structure to be heated.

3. A block assembly in accordance with claim 1 wherein said fin means includes heat-absorbing means.

4. A block assembly in accordance with claim 1 wherein said control means includes drive means for pivoting said fin means.

5. A block assembly in accordance with claim 1 wherein said cover is generally domed.

6. A block assembly in accordance with claim 1 wherein said support walls are integrally connected to said cover.

7. A block assembly in accordance with claim 1 wherein said cavity is an evacuated cavity.

8. A block assembly in accordance with claim 1 wherein said block means defines port means communicating with said cavity for selectively introducing or removing fluid from the cavity, and means for normally closing said port.

9. A light-transmissive, insulating solar structure having a heat absorbing exterior and an interior to be heated comprising:

a plurality of generally rigid, fluid impervious barriers including a roof and upright walls for supporting said roof;

at least one of said barriers comprising an array of light-transmissive insulating modules in communication with each other, each of said modules comprising:

light-transmissive insulating block means encapsulating an evacuated cavity for insulating the interior of said structure;

a housing having a light-transmissive cover providing a portion of the exterior surface of said structure and a plurality of support members extending between and separating said cover and said block means, said housing cooperating with said block means to define a flow chamber therebetween, said support defining a plurality of channels for passage of air into and out of said chamber;

fin means extending between and rotatably connected to said support members; and drive means for driving said fin means to a fully open position substantially parallel to the sun for maximum passage of sunlight through said flow chamber, to a fully closed position generally parallel to said block means for substantially blocking and preventing the passage of sunlight through said flow chamber and into the interior of said structure, and to partially open positions therebetween at an angle of inclination relative to said sun and said block means for partially permitting passage of light through said flow chamber.

10. A light-transmissive insulating structure in accordance with claim 9 wherein said fin means has at least one reflective surface for reflecting radiant heat from the interior of said structure back through said block means and into the interior of said structure when said fin means are in said fully closed position.

11. A light-transmissive insulating structure in accordance with claim 10 wherein said fin means has a heat-absorbing surface generally opposite said reflective surface for absorbing heat from the sun when said fin means are in at least in said partially open position.

12. A light transmissive insulating structure in accordance with claim 9 wherein said drive means includes pinion gear means fixedly connected to said fin means, drive bar means having a rack with a set of gear teeth thereon meshingly engaging and driving said pinion gear means, and motor means for driving said drive bar means.

13. A light-transmissive insulating structure in accordance with claim 9 wherein said cover is generally convex and has an overhanging lip.

14. A light-transmissive insulating structure in accordance with claim 9 wherein said block means has a first surface generally facing said flow chamber and a second surface facing the interior of said structure, each of said surfaces having a set of generally convex portions cooperating with said convex portions of said other surface to define an evacuated cavity, block support means extending between and supportingly connecting said first and second surfaces for enhancing the structural strength of said block means, said block means defining port means communicating with said evacuated cavity for withdrawing air and other fluid from said cavity, means for normally closing said port.

15. A structure of claim 12 wherein the drive means includes a drive bar operatively connected to and driving said fin means which is frictionally gripped by said rack and driven thereby and which will slide at a force greater than the normal force required to rotate the fin means to thereby form a slip joint to synchronize movement of the fin means and prevent malfunction thereof.

16. A light-transmissive insulating solar structure having a heat absorbing exterior and an interior to be heated comprising:

a plurality of generally rigid, fluid impervious barriers including a roof and upright walls for supporting said roof;

at least one of said barriers comprising a set of interconnected light-transmissive insulating modules in communication with each other, each of said modules comprising:

an array of cellular light-transmissive blocks for insulating the interior of said structure, said cellular blocks having substantially symmetrical convex surfaces including a first surface generally facing the interior of said structure and a second surface, said symmetrical surfaces having portions spaced apart from and cooperating with each other to define evacuated chamber means therebetween, and at least one of said cellular blocks defining an evacuation port communicating with said evacuation chamber and having evacuated port closure means for normally closing said port;

a housing having a light-transmissive cover providing at least a portion of the exterior surface of said structure and a plurality of support members extending between and separating said cover and said cellular blocks, said cover having a generally dome-shaped portion for enhanced structural strength and overhanging flanges for flexibly sealingly engaging the flanges of adjacent covers, said support members being spaced laterally inwardly from the ends of said flanges to provide a drive-means-receiving chamber between the support members of adjacent modules, said housing cooperating with said cellular blocks to define a circulation chamber therebetween for removing heat from said modules, said support members defining a plurality of air passageways communicating with said circulation chamber;

a set of substantially parallel fins extending between said support members, said fins having opposed generally planar surfaces including a reflecting surface and a heat-absorbing surface;

a set of fin connectors for pivotally connecting said fins to said support members, each of said connectors having a fin-receiving portion for securely grasping one of said fins and a locking portion positioned in said drive means-receiving chamber for interlocking engagement with the locking portion of an adjacent fin, each set of adjacent locking portions having a hub with gear teeth thereon positioned in said drive means-receiving chamber;

drive means including at least one drive bar and a motor for driving said drive bar, said drive bar having gear teeth for meshingly engaging and synchronously driving said gear teeth on said fins to a fully open position substantially parallel to the sun for maximizing passage of sunlight through said circulation chamber, to a fully closed position with said reflecting surface generally facing said cellular blocks for substantially blocking the passage of sunlight through said flow chamber while concurrently reflecting heat from the exterior of said structure back to said interior, and to partially open positions therebetween and at an angle of inclination relative to the sun and cellular blocks for partially permitting passage of light through said flow chamber while said heat absorbing surface concurrently absorbs and collects solar heat.

* * * * *